(12) United States Patent
Harada et al.

(10) Patent No.: US 11,987,533 B2
(45) Date of Patent: May 21, 2024

(54) CERAMIC MATRIX COMPOSITE COMPONENT AND METHOD OF PRODUCING THE SAME

(71) Applicant: IHI Corporation, Koto-ku (JP)

(72) Inventors: Rie Harada, Tokyo (JP); Yousuke Mizokami, Tokyo (JP); Takahiko Shinohara, Tokyo (JP); Shinji Muto, Tokyo (JP)

(73) Assignee: IHI Corporation, Koto-ku (JP)

( * ) Notice: Subject to any disclaimer, the term of this patent is extended or adjusted under 35 U.S.C. 154(b) by 1428 days.

(21) Appl. No.: 16/181,932

(22) Filed: Nov. 6, 2018

(65) Prior Publication Data

US 2019/0071364 A1    Mar. 7, 2019

Related U.S. Application Data

(63) Continuation of application No. PCT/JP2017/013199, filed on Mar. 30, 2017.

(30) Foreign Application Priority Data

Jun. 13, 2016 (JP) .................. 2016-116920

(51) Int. Cl.
*C04B 37/00* (2006.01)
*B23K 1/00* (2006.01)
(Continued)

(52) U.S. Cl.
CPC .............. *C04B 37/003* (2013.01); *B23K 1/19* (2013.01); *C04B 41/009* (2013.01);
(Continued)

(58) Field of Classification Search
CPC . C04B 37/003; C04B 41/009; C04B 41/5059; C04B 41/87; C04B 37/006;
(Continued)

(56) References Cited

U.S. PATENT DOCUMENTS 3,813,759 A   6/1974  Heap et al.
4,626,516 A   12/1986 Morelock
(Continued)

FOREIGN PATENT DOCUMENTS

CN   1597621 A   3/2005
CN   1712167 A   12/2005
(Continued)

OTHER PUBLICATIONS

Combined Chinese Office Action and Search Report dated Apr. 20, 2021 in Patent Application No. 201780028049.X (with English translation of Category of Cited Documents), 8 pages.

(Continued)

*Primary Examiner* — Audrey B. Walter
(74) *Attorney, Agent, or Firm* — Oblon, McClelland, Maier & Neustadt, L.L.P.

(57) ABSTRACT

A ceramic matrix composite component includes a first substrate and a second substrate each formed of a silicide-containing ceramic matrix composite, silicon carbide layers respectively coating a bonding surface of the first substrate and a bonding surface of the second substrate, and a bonding layer formed of a silicon-containing alloy and provided between the silicon carbide layer coating the bonding surface of the first substrate and the silicon carbide layer coating the bonding surface of the second substrate.

19 Claims, 5 Drawing Sheets

(51) Int. Cl.
*B23K 1/19* (2006.01)
*C04B 41/00* (2006.01)
*C04B 41/50* (2006.01)
*C04B 41/87* (2006.01)
*F01D 5/28* (2006.01)
*F02K 9/97* (2006.01)

(52) U.S. Cl.
CPC .......... *C04B 41/5059* (2013.01); *C04B 41/87* (2013.01); *F01D 5/282* (2013.01); *F01D 5/284* (2013.01); *F01D 5/288* (2013.01); *F02K 9/97* (2013.01); *B23K 1/00* (2013.01); *C04B 37/006* (2013.01); *C04B 2237/122* (2013.01); *C04B 2237/128* (2013.01); *C04B 2237/16* (2013.01); *C04B 2237/36* (2013.01); *C04B 2237/365* (2013.01); *C04B 2237/38* (2013.01); *C04B 2237/52* (2013.01); *C04B 2237/555* (2013.01); *C04B 2237/61* (2013.01); *C04B 2237/708* (2013.01); *F05D 2230/237* (2013.01); *F05D 2230/90* (2013.01); *F05D 2300/2261* (2013.01); *F05D 2300/6033* (2013.01)

(58) Field of Classification Search
CPC ........ C04B 2237/122; C04B 2237/128; C04B 2237/16; C04B 2237/36; C04B 2237/365; C04B 2237/38; C04B 2237/52; C04B 2237/555; C04B 2237/61; C04B 2237/708; B23K 1/19; B23K 1/00; B23K 2101/001; B23K 2103/16; B23K 2103/52; B23K 1/0018; B23K 1/008; B23K 1/20; F01D 5/282; F01D 5/284; F01D 5/288; F02K 9/97; F05D 2230/237; F05D 2230/90; F05D 2300/2261; F05D 2300/6033

See application file for complete search history.

(56) References Cited

U.S. PATENT DOCUMENTS

| | | | |
|---|---|---|---|
| 4,793,859 A | 12/1988 | Morelock | |
| 5,336,350 A | 8/1994 | Singh | |
| 5,975,407 A * | 11/1999 | Gasse | C04B 37/006 228/248.5 |
| 6,221,499 B1 | 4/2001 | Gasse et al. | |
| 2003/0051342 A1* | 3/2003 | Hasegawa | B23K 35/286 29/890.03 |
| 2006/0006212 A1* | 1/2006 | Thebault | B23K 1/20 228/186 |
| 2006/0141154 A1* | 6/2006 | Thebault | C04B 41/009 427/249.2 |
| 2006/0169404 A1 | 8/2006 | Thebault et al. | |
| 2008/0190552 A1 | 8/2008 | Bouillon et al. | |
| 2009/0120743 A1 | 5/2009 | Thebault et al. | |
| 2010/0075160 A1 | 3/2010 | Chaumat et al. | |
| 2012/0177488 A1 | 7/2012 | Corman | |
| 2013/0064602 A1 | 3/2013 | Chaumat et al. | |
| 2014/0322024 A1 | 10/2014 | Watanabe | |
| 2015/0079371 A1* | 3/2015 | Nakada | C23C 4/11 428/448 |
| 2015/0258637 A1* | 9/2015 | Asagi | H05K 3/3485 420/577 |
| 2017/0292388 A1 | 10/2017 | Watanabe | |

FOREIGN PATENT DOCUMENTS

| | | | | |
|---|---|---|---|---|
| CN | 1988977 A | | 6/2007 | |
| CN | 102513636 A | | 6/2012 | |
| CN | 102689109 A | | 9/2012 | |
| CN | 103890348 A | | 6/2014 | |
| CN | 103964884 A | | 8/2014 | |
| CN | 104402533 A | | 3/2015 | |
| CN | 105622125 A | | 6/2016 | |
| EP | 0 636 700 A2 | | 2/1995 | |
| EP | 0 806 402 A1 | | 11/1997 | |
| EP | 806402 A1 | * | 11/1997 | ......... C04B 35/6269 |
| EP | 2 857 193 A1 | | 4/2015 | |
| FR | 2 653 763 A1 | | 5/1991 | |
| FR | 2 851 244 A1 | | 8/2004 | |
| JP | 7-189607 | | 7/1995 | |
| JP | 2006-8508 | | 1/2006 | |
| JP | 2006-517174 | | 7/2006 | |
| JP | 2010-77019 | | 4/2010 | |
| JP | 2010-229025 | | 10/2010 | |
| JP | 4851125 | | 1/2012 | |
| JP | 2013-112561 | | 6/2013 | |
| JP | 2013-522154 | | 6/2013 | |
| JP | 2013112561 A | * | 6/2013 | |

OTHER PUBLICATIONS

Han Li, "New technology of practical Chinese medicine preparation," Chemical Industry Press, Nov. 2002, 5 pages (with partial English language translation).
Extended European Search Report dated Jan. 8, 2020 in Patent Application No. 17812982.1, 7 pages.
International Search Report dated Jun. 27, 2017 in PCT/JP2017/013199, filed on Mar. 30, 2017 (with English Translation).
Written Opinion dated Jun. 27, 2017 in PCT/JP2017/013199, filed on Mar. 30, 2017.
Bansal, N., et al. "Processing and Properties of Advanced Ceramics and Composites II", Ceramic Transactions, vol. 220, 2010, p. 179.
Combined Chinese Office Action and Search Report dated Nov. 11, 2020 in CHinese Patent Application No. 201780028049.X (with English translation of Category of Cited Documents), 9 pages.

* cited by examiner

CERAMIC MATRIX COMPOSITE COMPONENT AND METHOD OF PRODUCING THE SAME

CROSS REFERENCE TO RELATED APPLICATIONS

This application is a continuation application of International Application No. PCT/JP2017/013199, filed on Mar. 30, 2017, which claims priority to Japanese Patent Application No. 2016-116920, filed on Jun. 13, 2016, the entire contents of which are incorporated by references herein.

BACKGROUND

1. Field

The present disclosure relates to a ceramic matrix composite component and a method of producing the same.

2. Description of the Related Art

Ceramic matrix composites (CMCs), which have better heat resistance and higher specific strength in a high-temperature range than heat-resistant alloys such as nickel alloys, have drawn attention in recent years for gas turbine components and shroud components of jet engines, as well as high-temperature components, such as thrusters, of rocket engines, which are used in high-temperature environments. Ceramic matrix composites are composite materials in which a ceramic matrix is reinforced by reinforcing fibers such as ceramic fibers. See Japanese Patent Application Publication No. Hei 7-189607 (Patent Literature 1).

SUMMARY

It is however sometimes difficult to produce a component having a complicated shape, a large-size component or the like, such as a gas turbine component, using a ceramic matrix composite, because of difficulty in forming a preform of reinforcing fibers.

With this taken into consideration, an object of this disclosure is to provide a ceramic matrix composite component which makes it possible to easily produce even a component having a complicated shape or the like, such as a gas turbine component, and a method of producing the same.

A ceramic matrix composite component according to an embodiment of the present disclosure includes a first substrate and a second substrate each formed of a silicide-containing ceramic matrix composite, silicon carbide layers respectively coating a bonding surface of the first substrate and a bonding surface of the second substrate, and a bonding layer formed of a silicon-containing alloy and provided between the silicon carbide layer coating the bonding surface of the first substrate and the silicon carbide layer coating the bonding surface of the second substrate.

In the ceramic matrix composite component according to the embodiment of the present disclosure, the first substrate and the second substrate include sealing portions obtained by filling voids in the bonding surface of the first substrate and voids in the bonding surface of the second substrate with silicon carbide powder.

In the ceramic matrix composite component according to the embodiment of the present disclosure, the bonding layer is formed of a silicon-containing eutectic alloy.

In the ceramic matrix composite component according to the embodiment of the present disclosure, the silicon-containing eutectic alloy is a eutectic alloy containing Si and at least one element of Ti, Y and Hf.

In the ceramic matrix composite component according to the embodiment of the present disclosure, a structure size of the bonding layer is less than 100 μm.

In the ceramic matrix composite component according to the embodiment of the present disclosure, the structure size of the bonding layer is a size of a metal silicide phase.

A method of producing a ceramic matrix composite component according to the embodiment of the present disclosure includes a silicon carbide layer coating step of coating bonding surfaces of a first substrate and a second substrate, each formed of a silicide-containing ceramic matrix composite, with silicon carbide layers, and a brazing step of brazing the silicon carbide layer coating the bonding surface of the first substrate and the silicon carbide layer coating the bonding surface of the second substrate by heating and thereby melting a brazing filler metal formed of a silicon-containing alloy.

In the method of producing a ceramic matrix composite component according to the embodiment of the present disclosure, the silicon carbide layer coating step includes filling and sealing voids in the bonding surface of the first substrate and voids in the bonding surface of the second substrate with silicon carbide powder, before coating the bonding surfaces with the silicon carbide layers.

In the method of producing a ceramic matrix composite component according to the embodiment of the present disclosure, the silicon carbide layer coating step includes filling and sealing the voids in the bonding surface of the first substrate and the voids in the bonding surface of the second substrate with silicon carbide powder by immersing the first substrate and the second substrate in slurry containing the silicon carbide powder while applying ultrasonic vibration to the slurry, before coating the bonding surfaces with the silicon carbide layers.

In the method of producing a ceramic matrix composite component according to the embodiment of the present disclosure, the silicon carbide layer coating step includes defoaming the slurry, and applying the ultrasonic vibration to the slurry after immersing and leaving the first substrate and the second substrate stand in the defoamed slurry.

In the method of producing a ceramic matrix composite component according to the embodiment of the present disclosure, an average particle size of the silicon carbide powder is 3 μm or greater but 5 μm or less.

In the method of producing a ceramic matrix composite component according to the embodiment of the present disclosure, the brazing filler metal is a silicon-containing eutectic alloy.

In the method of producing a ceramic matrix composite component according to the embodiment of the present disclosure, in the silicon carbide layer coating step, the silicon carbide layers are formed by chemical vapor infiltration.

In the method of producing a ceramic matrix composite component according to the embodiment of the present disclosure, in the brazing step, the brazing filler metal is heated at a temperature equal to or greater than a melting point of the silicon-containing alloy, but less than a crystal grain coarsening temperature of reinforcing fiber in the ceramic matrix composite.

In the method of producing a ceramic matrix composite component according to the embodiment of the present disclosure, in the brazing step, the silicon carbide layer coating the bonding surface of the first substrate and the silicon carbide layer coating the bonding surface of the second substrate are butted up against each other with a gap provided in between, and the gap is filled with the brazing filler metal by making the brazing filler metal, as melted, flow into the gap from outside of the gap.

In the method of producing a ceramic matrix composite component according to the embodiment of the present disclosure, in the brazing step, the brazing is performed by applying the brazing filler metal to at least one of surfaces of the silicon carbide layers coating the bonding surfaces of the first substrate and the second substrate, and thereafter butting up the surfaces of the silicon carbide layers against each other.

In the method of producing a ceramic matrix composite component according to the embodiment of the present disclosure, in the brazing step, an average particle size of the brazing filler metal is 45 μm or less.

According to the above configurations, even a component having a complicated shape and the like, such as a gas turbine component, can be easily produced, and the productivity is increased, since such a component may be integrated from its divided members by bonding the members together through brazing.

DESCRIPTION OF EMBODIMENTS

Figure 1:
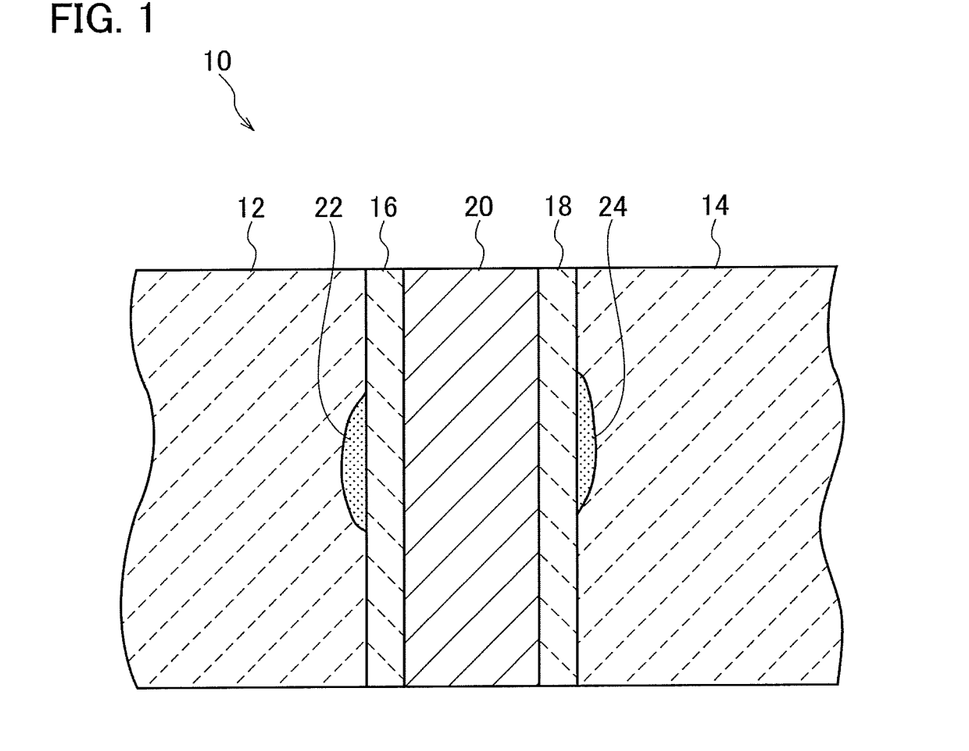
FIG. 1 is a cross-sectional diagram showing the configuration of a ceramic matrix composite component according to an embodiment of the present disclosure.

An embodiment of the present disclosure will be described below in detail with reference to the drawings. FIG. 1 is a cross-sectional diagram showing the configuration of a ceramic matrix composite component 10. The ceramic matrix composite component 10 includes a first substrate 12, a second substrate 14, silicon carbide layers 16, 18, and a bonding layer 20. The ceramic matrix composite component 10 is, for example, a gas turbine component such as a jet engine turbine blade, a high-temperature component such as a rocket engine thruster, or the like.

The first substrate 12 and the second substrate 14 are formed of a silicide-containing ceramic matrix composite. The ceramic matrix composite includes reinforcing fibers and a ceramic matrix.

The reinforcing fibers to be used are, for example, continuous fibers, discontinuous fibers or whiskers of silicon carbide fibers (SiC fibers), silicon nitride fibers ($Si_3N_4$ fibers), carbon fibers and graphite fibers. A preform to be used is, for example, a fiber fabric having a three-dimensional structure obtained by bundling several hundreds to several thousands of filaments of reinforcing fiber in fiber bundles and then weaving the fiber bundles in the XYZ-directions, a fabric having a two-dimensional structure such as plain weave fabric or satin weave fabric, or the like. Furthermore, the ceramic matrix to be used is, for example, silicon carbide, silicon nitride, or the like.

At least either of the reinforcing fibers or the ceramic matrix is formed of silicide, and both of the reinforcing fibers and the ceramic matrix may be formed of silicide. Moreover, the reinforcing fibers and the ceramic matrix may be made of the same material or different materials. It should be noted that silicides include silicon as well as silicon-containing compounds such as silicon carbide and silicon nitride, or the like.

The ceramic matrix composite to be used is, for example, a SiC/SiC composite made of silicon carbide fibers and a silicon carbide matrix, a SiC/$Si_3N_4$ composite made of silicon carbide fibers and a silicon nitride matrix, and a $Si_3N_4$/$Si_3N_4$ composite made of silicon nitride fibers and a silicon nitride matrix. Incidentally, the SiC/SiC composite may be used as the ceramic matrix composite in order to enhance adhesion to the silicon carbide layers 16, 18, as well as to reduce thermal stress of the silicon carbide layers 16, 18.

The first substrate 12 and the second substrate 14 may be formed of the same ceramic matrix composite, or of their respective different ceramic matrix composites. For example, the first substrate 12 and the second substrate 14 may be formed of SiC/SiC composite. Otherwise, the first substrate 12 may be formed of SiC/SiC composite and the second substrate 14 may be formed of SiC/$Si_3N_4$ composite. Incidentally, the first substrate 12 and the second substrate 14 may be formed of the same ceramic matrix composite in order to reduce thermal stress of the bonding layer 20.

The first substrate 12 and the second substrate 14 may include sealing portions 22, 24 obtained by filling voids in the bonding surface of the first substrate 12 and voids in the bonding surface of the second substrate 14 with silicon carbide powder. The ceramic matrix composite has voids in spaces between woven fiber bundles or the like, since the ceramic matrix composite is usually made by impregnating the preform made of the reinforcing fiber with ceramics. Furthermore, three-dimensional woven fabric obtained by sewing plain-woven fabric, satin-woven fabric or the like with Z threads tends to have a smaller number of voids in a surface (the X-Y plane) of the woven fabric, but a larger number of voids in surfaces (the X-Z plane and the Y-Z plane) orthogonal to the surface of the woven fabric. Therefore, the first substrate 12 and the second substrates 14 may be provided with the sealing portions 24 for sealing the voids in their bonding surfaces by filling the voids with silicon carbide powder. This makes it possible to smooth out the bonding surfaces of the first substrates 12 and second substrate 14. Moreover, since the sealing portions 22, 24 are formed of silicon carbide powder, it is possible to enhance adhesion between the sealing portions 22, 24 and the first and second substrates 12, 14 which are formed of the silicide-containing ceramic matrix composite.

The silicon carbide layers 16, 18 are formed of silicon carbide (SiC), and respectively coat the bonding surface of the first substrate 12 and the bonding surface of the second substrate 14. The silicon carbide layers 16, 18 each have a function of densifying the bonding surfaces of the first and second substrates 12, 14, and thereby inhibiting impregnation of the first and second substrates 12, 14 with brazing filler metal to be used to form the bonding layer 20, as discussed later. This makes it possible to secure the thickness of the bonding layer 20, and thus to enhance the bonding strength.

The thickness of the silicon carbide layers 16, 18 may be 1 μm or greater but 20 μm or less. Their thickness may be 5 μm or greater but 10 μm or less. This is because the density of the silicon carbide layers 16, 18 is lower if the thickness of the silicon carbide layers 16, 18 is less than 1 μm. This is also because the occurrence of a fracture in the silicon carbide layers 16, 18 is more probable as silicon carbide is a brittle material if the thickness of the silicon carbide layers 16, 18 is greater than 20 μm.

The bonding layer 20 is provided between the silicon carbide layer 16 coating the bonding surface of the first substrate 12 and the silicon carbide layer 18 coating the bonding surface of the second substrate 14. The bonding layer 20 is formed of a silicon-containing alloy. The bonding layer 20 has a function of bonding and thereby integrating the first substrate 12 and the second substrate 14. The thickness of the bonding layer 20 may be, for example, in a range of 10 μm to 1000 μm.

Since the bonding layer 20 is formed of the silicon-containing alloy, the difference between thermal expansion of the bonding layer 20 and thermal expansion of the first substrate 12 and the second substrate 14, and the difference between thermal expansion of the bonding layer 20 and thermal expansion of the silicon carbide layers 16, 18 are smaller than otherwise. This makes it possible to reduce the thermal stress which occurs in the bonding layer 20 and the silicon carbide layers 16, 18, as well as accordingly to inhibit things such as cracks in the silicon carbide layers 16, 18, and separation between the bonding layer 20 and the silicon carbide layers 16, 18 along their interface.

The bonding layer 20 may be formed of a silicon-containing eutectic alloy. The melting point of the silicon-containing eutectic alloy is lower than those of the alloy components, such as silicon, which are made into the silicon-containing eutectic alloy. For this reason, the brazing temperature, although discussed later, can be made lower. This makes it possible to inhibit coarsening crystal grains of the reinforcing fiber and the like, and accordingly to inhibit a decrease in mechanical strength of the ceramic matrix composite.

The silicon-containing eutectic alloy may include not only the alloy made of the eutectic alloy composition, but also an alloy made of composition near the eutectic alloy composition. The alloy made of the composition near the eutectic alloy composition also makes it possible to inhibit a decrease in the mechanical strength of the ceramic matrix composite, since its melting point is lower than those of the alloy components, such as silicon.

A eutectic alloy containing Si and a least one element of Ti, Y and Hf may be used as the silicon-containing eutectic alloy. For example, a Si—Ti eutectic alloy, a Si—Y eutectic alloy or a Si—Hf eutectic alloy may be used as the silicon-containing eutectic alloy. Incidentally, not only a binary eutectic alloy, but also a ternary eutectic alloy and a quaternary eutectic alloy may be used as the silicon-containing eutectic alloy.

A Si-15 at % Ti eutectic alloy and a Si-86 at % Ti eutectic alloy may be used as the Si—Ti eutectic alloy. In this respect, the Si-15 at % Ti eutectic alloy contains 15 at % Ti, and the rest of the alloy contains Si and inevitable impurities. Meanwhile, the Si-86 at % Ti eutectic alloy contains 86 at % Ti, and the rest of the alloy contains Si and inevitable impurities. The Si-15 at % Ti eutectic alloy may be used as the silicon-containing eutectic alloy in order to reduce the difference between the thermal expansion of the bonding layer 20 and the thermal expansion of the first substrate 12 and the second substrate 14, as well as the difference between the thermal expansion of the bonding layer 20 and the thermal expansion of the silicon carbide layers 16, 18, since the amount ratio of Si is larger in the Si-15 at % Ti eutectic alloy.

A Si-18 at % Y eutectic alloy and a Si-87 at % Y eutectic alloy may be used as the Si—Y eutectic alloy. In this respect, the Si-18 at % Y eutectic alloy contains 18 at % Y, and the rest of the alloy contains Si and inevitable impurities. Meanwhile, the Si-87 at % Y eutectic alloy contains 87 at % Y, and the rest of the alloy contains Si and inevitable impurities. The Si-18 at % Y eutectic alloy may be used as the Si—Y eutectic alloy in order to reduce the difference between the thermal expansion of the bonding layer 20 and the thermal expansion of the first substrate 12 and the second substrate 14, as well as the difference between the thermal expansion of the bonding layer 20 and the thermal expansion of the silicon carbide layers 16, 18, since the amount ratio of Si is larger in the Si-18 at % Y eutectic alloy.

A Si-9.5 at % Hf eutectic alloy may be used as the Si—Hf eutectic alloy. In this respect, the Si-9.5 at % Hf eutectic alloy contains 9.5 at % Hf, and the rest of the alloy contains Si and inevitable impurities.

The structure size of the bonding layer 20 may be less than 100 μm. The structure size of the bonding layer 20 is a size of a metal silicide phase which is formed when the silicon-containing alloy which the later-discussed brazing filler metal is made of is melted and solidified. The size of the metal silicide phase in the bonding layer 20 may be less than 100 μm. The size of the metal silicide phase is the overall size of the metal silicide phase. When the size of the metal silicide phase in the bonding layer 20 is less than 100 μm, the mechanical strength and the like of the bonding layer 20 can be enhanced.

In the case where the bonding layer 20 is formed of the silicon-containing eutectic alloy, the size of the metal silicide phase is the size of the silicon-containing eutectic phase in the silicon-containing eutectic structure of the bonding layer 20. For example, in the case where the bonding layer 20 is formed of the Si—Ti eutectic alloy, the size of the metal silicide phase is the size of the Si—Ti eutectic phase in the Si—Ti eutectic structure of the bonding layer 20. The size of the metal silicide phase in the bonding layer 20 can be obtained, for example, by observing the cross-sectional metal structure of the bonding layer 20 using an optical microscope, a scanning electron microscope or the like, and measuring the length of the metal silicide phase in a direction orthogonal to the thickness direction of the bonding layer 20 (in a direction along the bonding surfaces of the first substrate 12 and the second substrate 14).

Figure 2:
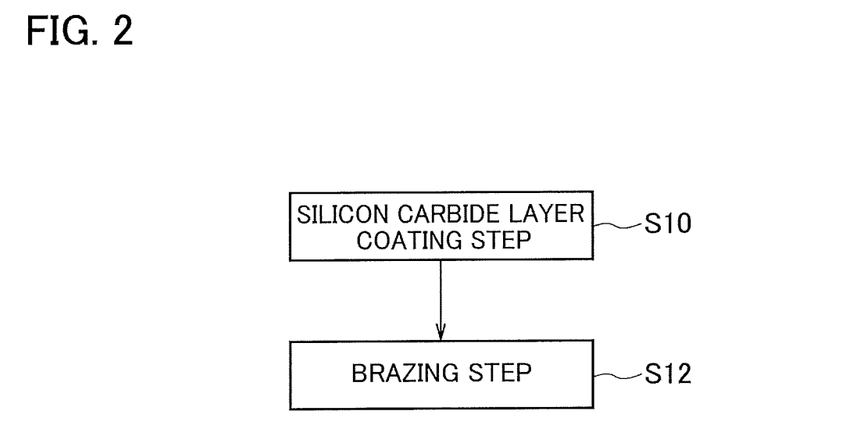
FIG. 2 is a flowchart showing a method of producing the ceramic matrix composite component according to the embodiment of the present disclosure.

Next, descriptions will be provided for a method of producing the ceramic matrix composite component 10. FIG. 2 is a flowchart showing the method of producing the ceramic matrix composite component 10. The method of producing the ceramic matrix composite component 10 includes a silicon carbide layer coating step (S10) and a brazing step (S12).

First of all, descriptions will be provided for how to form the first substrate 12 and the second substrate 14. The first substrate 12 and the second substrate 14 can be formed using a general ceramic matrix composite forming method. The first substrate 12 and the second substrate 14 are formed, for example, by forming the preform, such as the three-dimensional woven fabric, from the silicon carbide fiber or the like, and thereafter infiltrating the ceramic matrix, such as silicon carbide, into the preform by chemical vapor infiltration (CVI) to form the ceramic matrix composite, and thereby forming the ceramic matrix in between the fibers of the preform. Examples of usable silicon carbide fiber include Tyranno Fiber® (manufactured by Ube Industries, Ltd.) and Hi-Nicalon® (manufactured by Nippon Carbon Co., Ltd.).

Alternatively, the first substrate 12 and the second substrate 14 may be formed by impregnating the preform with an organic metal polymer (a ceramic matrix precursor), such as polycarbosilane, and thereafter sintering the resultant preform in an inert atmosphere. Otherwise, the first substrate 12 and the second substrate 14 may be formed by mixing the reinforcing fiber, such as silicon carbide fiber, and raw material powder (for example, silicon powder and carbon powder) for forming the ceramic matrix of silicon carbide or the like, and forming the ceramic matrix in between the fibers of the preform by reactive sintering using hot press or hot isostatic press (HIP). Instead, the first substrate 12 and the second substrate 14 may be formed by forming the ceramic matrix in between the fibers of the preform using these forming methods in combination.

The silicon carbide layer coating step (S10) is a step of coating the bonding surfaces of the first substrate 12 and the second substrate 14, each formed of the silicide-containing ceramic matrix composite, with the silicon carbide layers 16, 18.

Before coating the bonding surfaces of the first substrate 12 and the second substrate 14 with the silicon carbide layers 16, 18, the sealing portions 22, 24 may be formed in the bonding surfaces of the first substrate 12 and the second substrate 14 by filling and sealing the voids in the bonding surface of the first substrate 12 and the voids in the bonding surface of the second substrate 14 with the silicon carbide powder. The sealing portions 22, 24 are formed by impregnating the voids in the bonding surfaces of the first substrate 12 and the second substrate 14 with slurry obtained by dispersing the silicon carbide powder in a solvent of ethanol or the like, and thereby filling the voids with the silicon carbide powder. Thus, the bonding surfaces of the first substrate 12 and the second substrate 14 are smoothed out, and therefore can be coated densely with the silicon carbide layers 16, 18. Incidentally, regarding the silicon carbide powder and the solvent, general commercially-available silicon carbide powder and solvent may be used.

Next, detailed descriptions will be provided for how to form the sealing portions 22, 24. In the silicon carbide layer coating step (S10), before coating the bonding surfaces of the first substrate 12 and the second substrate 14 with the silicon carbide layers 16, 18, the voids in the bonding surface of the first substrate 12 and the voids in the bonding surface the second substrate 14 may be filled and sealed with the silicon carbide powder by immersing the first substrate 12 and the second substrate 14 in the slurry containing the silicon carbide powder while applying ultrasonic vibration to the slurry. Furthermore, the silicon carbide layer coating step may include defoaming the slurry containing the silicon carbide powder, and applying the ultrasonic vibration to the slurry after immersing and leaving the first substrate 12 and the second substrate 14 stand in the defoamed slurry.

To begin with, the slurry is prepared by pouring the dispersant of ethanol, methanol or acetone, and the silicon carbide powder into a container, and mixing them therein. The particle size of the silicon carbide powder may be 3 μm or greater but 5 μm or less in terms of average particle size. This is because, if the particle size of the silicon carbide powder is less than 3 μm in terms of average particle size, the silicon carbide powder easily agglomerates in the slurry, and the agglomeration is hard to break when the ultrasonic vibration is applied to the slurry. This is also because, if the average particle size of the silicon carbide powder is greater than 5 μm, the filling rate at which the voids in the bonding surfaces are filled with the silicon carbide powder is more likely to become lower.

The slurry in the container is vacuum-defoamed. Since the slurry is defoamed, bubbles and the like are removed from the slurry, and are thereby inhibited from getting into the voids in the bonding surfaces together with the silicon carbide powder while the voids are being filled with the silicon carbide powder. The vacuum may be performed using a generally-used vacuum pump or the like. After defoamed, stopping the vacuuming, the slurry is released to the atmosphere.

Thereafter, the first substrate 12 and the second substrate 14 are put into the container, and are immersed in the slurry. The first substrate 12 and the second substrate 14 are left to stand while immersed in the slurry. A length of time for which the first substrate 12 and the second substrate 14 are left to stand may be in a range of 30 minutes to 60 minutes. While the first substrate 12 and the second substrate 14 are being left to stand, the silicon carbide powder precipitates into the slurry. This makes it possible to raise the filling rate at which the voids in the bonding surfaces are filled with the silicon carbide powder.

After the first substrate 12 and the second substrate 14 are left to stand, ultrasonic vibration is applied to the slurry in which the first substrate 12 and the second substrate 14 are immersed, using an ultrasonic vibrator. The ultrasonic vibration is transmitted to the silicon carbide powder mainly via the dispersant of ethanol or the like, and breaks the agglomeration of the silicon carbide powder. For this reason, it is possible to raise the filling rate at which the voids in the bonding surfaces are filled with the silicon carbide powder. The frequency of the ultrasonic vibration may be 23 kHz or greater but 28 kHz or less. In a case where the frequency of the ultrasonic vibration is less than 23 kHz, it is difficult to break the agglomeration of the silicon carbide powder, and the filling rate at which the voids in the bonding surfaces are filled with the silicon carbide powder is accordingly more likely to decrease. In a case where the frequency of the ultrasonic vibration is greater than 28 kHz, vibration of the silicon carbide powder is too large for the voids in the bonding surfaces to be filled with the silicon carbide powder. The output of the ultrasonic vibration may be, for example, 600 W. A length of time for which the ultrasonic vibration is applied to the slurry may be 10 minutes or greater but 15 minutes or less. Regarding the ultrasonic vibrator, a generally-used ultrasonic vibrator may be used.

After the application of the ultrasonic vibration, the first substrate 12 and the second substrate 14 are taken out of the slurry, and are dried. After the drying, surface finishing may be applied to the bonding surfaces of the first substrate 12 and the second substrate 14 to smooth out the bonding surfaces by removing silicon carbide powder adhering to the bonding surfaces, except for the sealing portions 22, 24, using a spatula or the like. With the above procedure, the sealing portions 22, 24 can be formed by filling the voids in the bonding surfaces of the first substrate 12 and the second substrate 14 with the silicon carbide powder.

Since the sealing portions 22, 24 are formed from the filled silicon carbide powder, heat resistance and oxidation resistance of the sealing portions 22, 24 can be enhanced. In addition, since the sealing portions 22, 24 can be easily formed by filling the voids with the silicon carbide powder, the work of forming the sealing portions 22, 24 can be more efficiently carried out than, for example, with silicon carbide formed by making carbon powder and melted silicon react on each other, and with silicon carbide formed by pyrolyzing a silicon-based polymer.

The silicon carbide layers 16, 18 can be formed by thermal spraying, physical vapor deposition (PVD), such as sputtering and ion plating, chemical vapor infiltration (CVI), and the like. The silicon carbide layers 16, 18 may be formed by chemical vapor infiltration (CVI). This is because chemical vapor infiltration (CVI) makes it possible to form denser coating than thermal splaying and the like. In the case where the silicon carbide layers 16, 18 are formed by chemical vapor infiltration (CVI), the bonding surfaces of the first substrate 12 and the second substrate 14 can be coated with the silicon carbide layers 16, 18, for example, by setting and heating the first substrate 12 and the second substrate 14 in a reaction furnace, and supplying methyltrichlorosilane ($CH_3SiCl_3$) or the like, serving as the reaction gas, into the reaction furnace.

Figure 3:
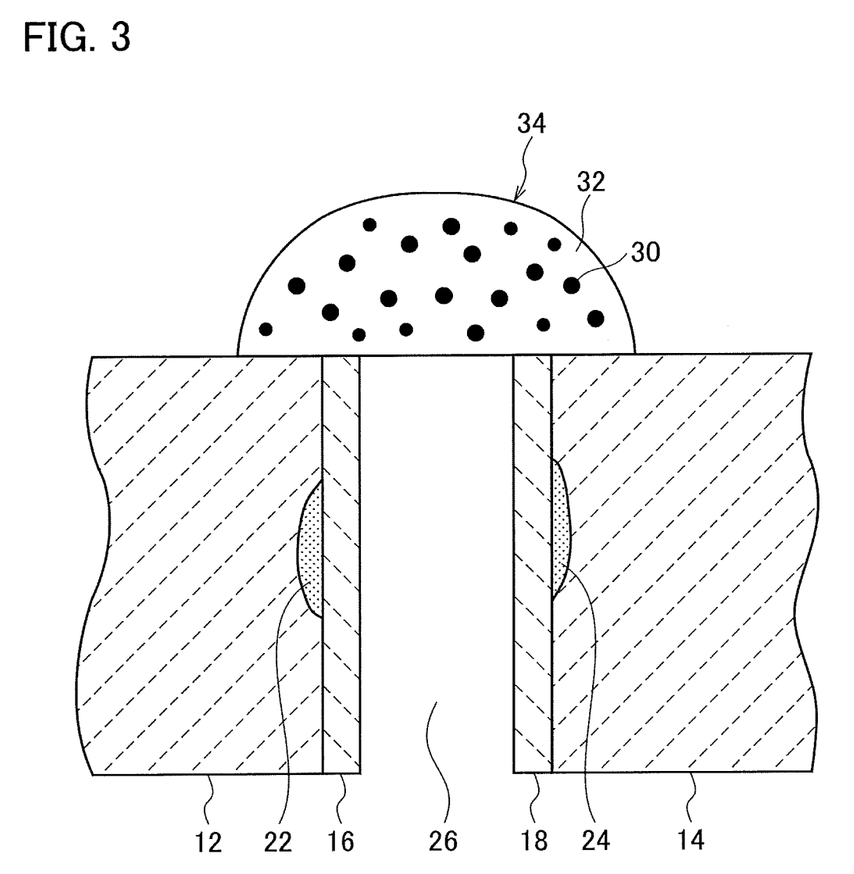
FIG. 3 is a diagram for explaining a brazing method according to the embodiment of the present disclosure.

The brazing step (S12) is a step of brazing the silicon carbide layer 16 coating the bonding surface of the first substrate 12 and the silicon carbide layer 18 coating the bonding surface of the second substrate 14 by heating and thereby melting the brazing filler metal formed of the silicon-containing alloy. FIG. 3 is a diagram for explaining the brazing method.

First of all, descriptions will be provided for the brazing filler metal 30. The brazing filler metal 30 is formed of the silicon-containing alloy. Since the brazing filler metal 30 contains silicon, the difference between the thermal expansion of the bonding layer 20 and the thermal expansion of the first and second substrates 12, 14, and the difference between the thermal expansion of the bonding layer 20 and the thermal expansion of the silicon carbide layers 16, 18 are smaller than otherwise. Thus, the thermal stress in the bonding layer 20 and the silicon carbide layers 16, 18 is lower. For this reason, cracks are inhibited in the silicon carbide layers 16, 18, as well as separation is inhibited along the interface between the bonding layer 20 and the silicon carbide layers 16, 18.

The brazing filler metal 30 may be in the form of a bulk material including small pieces, or in the form of powder. The structure size of the bonding layer 20 tends to become larger as the particle size of the brazing filler metal 30 becomes larger, and to become smaller as the particle size of the brazing filler metal 30 becomes smaller. When the average particle size of the brazing filler metal 30 is 45 μm or less, the structure size of the bonding layer 20 can be formed less than 100 μm.

More specifically, the average particle size of the brazing filler metal 30 may be 150 μm or less. The average particle size of the brazing filler metal 30 may be 45 μm or less. When the particles of the brazing filler metal 30 are controlled to be uniform, it is possible to make the melting behavior of the brazing filler metal 30 more uniform, and to make the metal structures of the bonding layer 20 after bonding the first substrate 12 and the second substrate 14 have a more uniform structure size, as well as to refine the metal structures thereof more. In addition, when the average particle size of the brazing filler metal 30 is 45 μm or less, it is possible to make the size of the metal silicide phase in the bonding layer 20 less than 100 μm. For example, powder having a size of 100 mesh-under obtained by sieving the brazing filler metal 30 with a 100 mesh screen may be used to make the average particle size of the brazing filler metal 30 equal to or less than 150 μm. For example, powder having a size of 325 mesh-under obtained by sieving the brazing filler metal 30 with a 325 mesh screen may be used to make the average particle size of the brazing filler metal 30 equal to or less than 45 μm.

The brazing filler metal 30 may be used in the form of water-atomized alloy powder, gas-atomized alloy powder or the like. Otherwise, alloy powder, small pieces or the like formed by pulverizing an ingot prepared alloy components with a jet mill or the like may be used as the brazing filler metal 30. The adjustment of the particle size of the brazing filler metal 30 can be performed by sieve classification or the like. The particle size of the brazing filler metal 30 and the particle size distribution can be measured using a general measurement method such as laser diffraction scattering method.

The brazing filler metal 30 may be formed of a silicon-containing eutectic alloy. The melting point of the silicon-containing eutectic alloy is lower than those of the alloy components, such as silicon, which are made into the silicon-containing eutectic alloy. The brazing temperature, therefore, can be made lower. This makes it possible to enhance productivity in the brazing work, and to reduce production cost. This also makes it possible to inhibit coarsening of crystal grains of the reinforcing fiber, and accordingly to inhibit a decrease in the mechanical strength of the ceramic matrix composite. Not only the alloy made of the eutectic alloy composition, but also an alloy made of composition near the eutectic alloy composition may be used for the silicon-containing eutectic alloy. The alloy made of the composition near the eutectic alloy composition also makes it possible to make the brazing temperature lower, since its melting point is lower than those of the alloy components, such as silicon.

The Si—Ti eutectic alloy, the Si—Y eutectic alloy or the Si—Hf eutectic alloy may be used for the brazing filler metal 30. Since the melting points of the Si-15 ata Ti eutectic alloy, the Si-86 at % Ti eutectic alloy, the Si-18 at % Y eutectic alloy, the Si-87 at % Y eutectic alloy and the Si-9.5 at % Hf eutectic alloy are all equal to or less than 1400° C., an decrease in the mechanical strength of the ceramic matrix composite can be inhibited even in the case where Tyranno Fiber® is used for the reinforcing fiber. The Si—Ti eutectic alloy may be used for the brazing filler metal 30, since the Si—Ti eutectic alloy has excellent oxidation resistance and the like.

As illustrated in FIG. 3, the brazing filler metal 30 may be a pasty brazing filler metal 34 obtained by mixing the brazing filler metal 30 and a binder 32. The pasty brazing filler metal 34 can be easily applied to complicated curvy bonding surfaces. A general commercially-available binder including a solvent and the like may be used as the binder 32. A mixture ratio of the brazing filler metal 30 to the binder 32 may be, for example, 20 (brazing filler metal) to 1 or less (binder) on a mass-ratio basis.

Next, descriptions will be provided for how to apply the brazing filler metal 30. The first substrate 12 and the second substrate 14 are arranged by butting up the silicon carbide layer 16 coating the bonding surface of the first substrate 12 and the silicon carbide layer 18 coating the bonding surface of the second substrate 14 against each other with a gap 26 for forming the bonding surface 20 provided in between. The space of the gap 26 may be, for example, in a range of 10 μm to 1000 μm.

The pasty brazing filler metal 34 is applied to the upper opening in the outer periphery of the gap 26 between the silicon carbide layer 16 coating the bonding surface of the first substrate 12 and the silicon carbide layer 18 coating the bonding surface of the second substrate 14. A general application method such as a method using a dispenser (a liquid dispensing device) may be used to apply the pasty brazing filler metal 34.

After the pasty brazing filler metal 34 is dried, the brazing is performed by heat-treating the brazing filler metal 30 at the brazing temperature which is equal to or greater than the melting point of the silicon-containing alloy, and heating the brazing filler metal 30. For example, in a case where the Si—Ti eutectic alloy is the brazing filler metal 30, the heat treatment is performed at the brazing temperature equal to or greater than 1330° C., since the melting point of the Si—Ti eutectic alloy is approximately 1330° C. In addition, the heat treatment may be performed at a temperature equal to or greater than the melting point of the silicon-containing alloy, but less than a crystal grain coarsening temperature at which the crystal grains of the reinforcing fiber in the ceramic matrix composite coarsen. The brazing at the temperature less than the crystal grain coarsening temperature at which the crystal grains of the reinforcing fiber coarsen makes it possible to inhibit a decrease in the mechanical strength of the ceramic matrix composite. For example, in a case where the reinforcing fiber is Tyranno Fiber®, the brazing temperature may be equal to or greater than the melting point of the silicon-containing alloy, but less than 1400° C. Regarding the heat treatment atmosphere, the brazing may be performed in vacuum or in an atmosphere of inert gas such as an argon gas in order to inhibit oxidation of the brazing filler metal 30 and the like. Regarding the heat treatment equipment, a general vacuum heat treatment furnace, a general atmosphere heat treatment furnace or the like to be used to heat-treat metal material and the like may be used.

The brazing filler metal 30 melted by the heat treatment flows into the gap 26 between the silicon carbide layer 16 coating the bonding surface of the first substrate 12 and the silicon carbide layer 18 coating the bonding surface of the second substrate 14, and the gap 26 is thereby filled with the melted brazing filler metal 30. Following the heating, the melted brazing filler metal 30 is cooled and solidified to form the bonding layer 20. Thereby, the silicon carbide layer 16 coating the bonding surface of the first substrate 12 and the silicon carbide layer 18 coating the bonding surface of the second substrate 14 are brazed together. The first substrate 12 and the second substrate 14 are bonded together by the bonding layer 20, and are integrated into a single unit.

Since the bonding surfaces of the first substrate 12 and the second substrate 14 are coated respectively with the silicon carbide layers 16, 18, infiltration of the melted brazing filler metal 30 into the voids in the first substrate 12 and the second substrate 14 is inhibited. This makes it possible to secure the thickness of the bonding layer 20, and accordingly to enhance the bonding strength of the ceramic matrix composite component 10.

Since the bonding layer 20 is formed by making the melted brazing filler metal 30 flow into the gap 26 between the silicon carbide layer 16 coating the bonding surface of the first substrate 12 and the silicon carbide layer 18 coating the bonding surface of the second substrate 14 from outside of the gap 26, the occurrence of voids in the bonding layer 20 is inhibited. In addition, since the brazing is performed by pouring the melted brazing filler metal 30 into the gap 26, the dimension of the gap 26 is easy to manage, and the accuracy in the dimension of the bonding layer 20 is higher than otherwise.

It should be noted that regarding the brazing method in the brazing step (S12), the silicon carbide layers 16, 18 coating the bonding surfaces of the first substrate 12 and the second substrate 14 may be brazed by butting up the silicon carbide layers 16, 18 against each other after the pasty brazing filler metal 34 is applied to at least one of the surfaces of the silicon carbide layers 16, 18. Since the heat treatment is performed with the surfaces to which the pasty brazing filler metal 34 is applied butted up against each other while pressed, etc., the first substrate 12 and the second substrate 14 can be integrated into a single unit by brazing the silicon carbide layers together.

According to the above configuration, the ceramic matrix composite component can be produced by brazing and thereby bonding the first substrate and the second substrate each formed of the silicon-containing ceramic matrix composite. Thereby, even a component having a complicated shape, a large-size component and the like, such as a gas turbine component, can be easily produced with an enhanced productivity, because such a component can be integrated from its divided members by bonding the members together through brazing.

For example, as such a ceramic matrix composite component, coupled turbine blades to be used in an aircraft turbine jet engine can be easily produced by bonding shroud parts and platform parts of the respective single blades by brazing, and thereby coupling them together.

According to the above configuration, the bonding surfaces of the first substrate and the second substrate are respectively coated with the silicon carbide layers, and the impregnation of the first substrate and the second substrate with the brazing filler metal is inhibited. This makes it possible to secure the thickness of the bonding layer, and accordingly to enhance the bonding strength. In addition, the bonding layer is formed of the silicon-containing alloy. This makes it possible to reduce the thermal stress applied by the bonding layer to the first substrate and the second substrate, and to the silicon carbide layers, as well as to enhance the adhesion between the bonding layer and the silicon carbide layers.

Examples

Figure 4A:
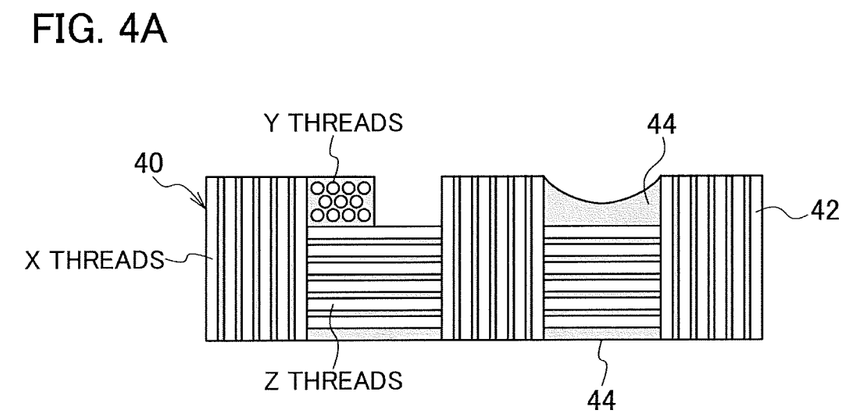
FIG. 4A is a diagram illustrating a structure of a substrate 40 for the production method of Example 1 in the embodiment of the present disclosure.
Figure 4B:
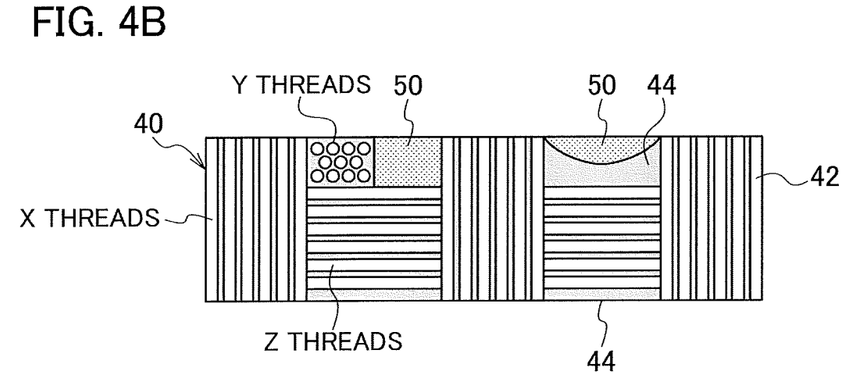
FIG. 4B is a diagram illustrating the structure of the substrate 40 in which sealing portions 50 are respectively formed in voids in a bonding surface for the production method of Example 1 in the embodiment of the present disclosure.
Figure 4C:
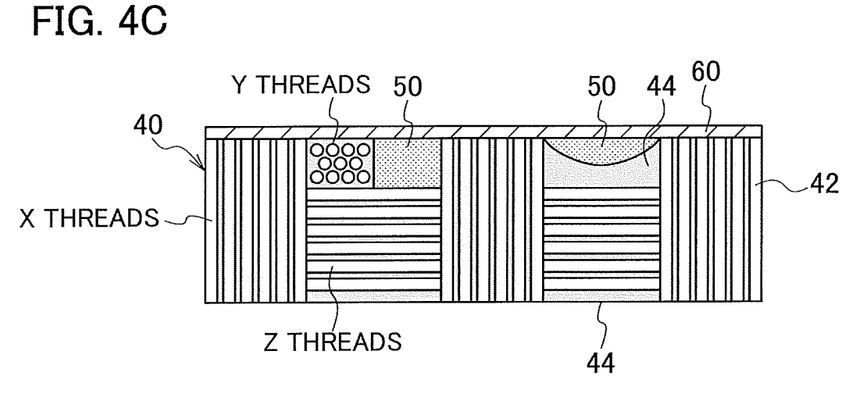
FIG. 4C is a diagram illustrating the structure of the substrate 40 in which the bonding surface is coated with a silicon carbide layer 60 for the production method of Example 1 in the embodiment of the present disclosure.

To begin with, descriptions will be provided for a production method of Example 1. FIG. 4A is a diagram illustrating a structure of a substrate 40 for the production method of Example 1. FIG. 4B is a diagram illustrating the structure of the substrate 40 in which sealing portions 50 are respectively formed in voids in a bonding surface for the production method of Example 1. FIG. 4C is a diagram illustrating the structure of the substrate 40 in which the bonding surface is coated with a silicon carbide layer 60 for the production method of Example 1.

The substrate 40 was formed of a SiC/SiC composite in which a SiC matrix 44 is filled in between the fibers of a preform made of SiC fiber. As illustrated in FIG. 4A, a three-dimensional woven fabric which was made of X threads, Y threads and Z threads made of the SiC fiber was used as the preform 42. Tyranno Fiber® (manufactured by Ube Industries, Ltd.) was used as the SiC fiber. The SiC/SiC composite was formed by impregnating the three dimensional woven fabric made of the SiC fiber with silicon powder and carbon powder, and forming the SiC matrix 44 in between the fibers of the preform 42 by reactive sintering. The substrate 40 was shaped like a rectangle with a vertical dimension of 25 mm, a horizontal dimension 20 mm and a thickness dimension of 4 mmt.

As illustrated in FIG. 4B, the sealing portions 50 were formed in the voids in the bonding surface of the substrate 40 by filling the voids with silicon carbide powder through impregnation of the voids with slurry in which the silicon carbide powder was dispersed.

Next, detailed descriptions will be provided for how to form the sealing portions 50. To begin with, the slurry was prepared by putting the dispersant of ethanol and the silicon carbide powder into a container, and mixing them therein. The particle size of the silicon carbide powder was 4 μm in terms of average particle size. The slurry in the container was vacuum-defoamed. After defoamed, stopping the vacuuming, the slurry was released to the atmosphere. The substrate 40 was put into the container, and was immersed in the slurry. The substrate 40 was left to stand while immersed in the slurry. A length of time for which the substrate 40 was left to stand was in a range of 30 minutes to 60 minutes. After the substrate 40 was left to stand, ultrasonic vibration was applied to the slurry in which the substrate 40 was immersed, using an ultrasonic vibrator. The frequency of the ultrasonic vibration was in a range of 23 kHz to 28 kHz. A length of time for which the ultrasonic vibration was applied to the slurry was in a range of 10 minutes to 15 minutes. After the ultrasonic vibration was applied to the slurry, the substrate 40 was taken out of the slurry, and was dried. After the drying, surface finishing was applied to the bonding surface of the substrate 40 in order to smooth out the bonding surface. With this procedure, the sealing portions 50 were formed in the voids in the bonding surface of the substrate 40 by filling the voids with the silicon carbide powder.

As illustrated in FIG. 4C, the bonding surface of the substrate 40 was coated with the silicon carbide layer 60 by chemical vapor infiltration (CVI). The bonding surface of the substrate 40 was coated with the silicon carbide layer 60 by setting the substrate 40 in a reaction furnace, heating the substrate 40 (at a reaction temperature of 900° C. to 1000° C.), and using methyltrichlorosilane ($CH_3SiCl_3$) as the reaction gas. The thickness of the silicon carbide layer 60 was in a range of 5 μm to 80 μm.

Next, descriptions will be provided for the brazing method. The Si-15 at Ti eutectic alloy (whose melting point was approximately 1330° C.) with an average particle size of 45 μm or less was used as the brazing filler metal. More specifically, the brazing filler metal was used in the form of powder with a size of 325 mesh-under which was obtained by sieving the brazing filler metal with a 325 mesh screen. The pasty brazing filler metal was prepared by mixing the brazing filler metal and the binder. The mixture ratio of the brazing filler metal to the binder was 20 (brazing filler metal) to 1 or less (binder) on a mass-ratio basis. A general binder including a solvent was used as the binder.

The pasty brazing filler metal was applied in the same way as illustrated in FIG. 3. The silicon carbide layer coating the bonding surface of one substrate and the silicon carbide layer coating the bonding surface of the other substrate were butted up against each other with a gap provided in between. The space of the gap between the silicon carbide layers was approximately 10 μm. The pasty brazing filler metal was applied along the upper opening in the outer periphery of this gap, and was dried naturally.

Subsequently, the brazing was performed by heating and melting the brazing filler metal through heat treatment in a vacuum heat treatment furnace, and making the melted brazing filler metal flow into the gap between the silicon carbide layers. The brazing temperature was 1375° C., and the holding time was 20 minutes. The heat treatment atmosphere was a vacuum at approximately $1.0 \times 10^{-2}$ Pa or less. From appearance observation, it was learned that in the specimen of Example 1, after the heat treatment, the brazing filler metal was melted to form the bonding layer, and the substrates were bonded by the bonding layer to be integrated into a single unit.

Descriptions will be provided for a production method of Example 2. The production method of Example 2 was different from the production method of Example 1 in terms of how to apply the pasty brazing filler metal, but was the same as the production method of Example 1 in terms of the other configuration. Powder of the Si-15 at % Ti eutectic alloy with an average particle size of 45 μm or less was used as the brazing filler metal. More specifically, the brazing filler metal was used in the form of powder with a size of 325 mesh-under which was obtained by sieving the brazing filler metal with a 325 mesh screen. In the production method of Example 2, the brazing was performed by applying the pasty brazing filler metal to the surfaces of the silicon carbide layers coating the bonding surfaces of the substrates, thereafter butting up the surfaces with the pasty brazing filler metal applied thereon against each other, and heat-treating the pasty brazing filler metal. The configuration of, and the heat treatment conditions for, the pasty brazing filler metal in the production method of Example 2 were the same as those in the production method of Example 1, and detailed descriptions for them will be omitted. From appearance observation, it was learned that in the specimen of Example 2, after the heat treatment, the brazing filler metal was melted to form the bonding layer, and the substrates were bonded by the bonding layer to be integrated into a single unit.

Descriptions will be provided for a production method of Example 3. The production method of Example 3 was different from the production method of Example 1 in terms of the configuration of the brazing filler metal, but was the same as the production method of Example 1 in terms of the other configuration. Small pieces of the Si-15 at % Ti eutectic alloy with a particle size of 3 mm to 5 mm were used as the brazing filler metal. The space of the gap between the silicon carbide layers coating the bonding surfaces of the substrates was approximately 15 μm. The method of applying the brazing filler metal and the heat treatment conditions for the brazing filler metal in the production method of Example 3 were the same as those in the production method of Example 1, and detailed descriptions for them will be omitted. From appearance observation, it was learned that in the specimen of Example 3, after the heat treatment, the brazing filler metal was melted to form the bonding layer, and the substrates were bonded by the bonding layer to be integrated into a single unit.

Next, descriptions will be provided for a production method of Comparative Example 1. The production method of Comparative Example 1 was different from the production method of Example 1 in that neither the silicon carbide layers nor the sealing portions were provided, but was as the same as the production method of Example 1 in terms of the other configuration. In other words, in the production method of Comparative Example 1, the pasty brazing filler metal was applied to the bonding surfaces of the substrates without providing the silicon carbide layers and the sealing portions to the bonding surfaces, and was heat-treated. From appearance observation, it was learned that in the specimen of Comparative Example 1, after the heat treatment, the substrates were separated from each other, and were thus not able to be bonded together. The bonding surfaces of the substrates were impregnated with the melted brazing filler metal.

For each of the specimens of Examples 1 to 3, the cross-section structure of a bonded joint was observed using an optical microscope. In each of the specimens of Examples 1 to 3, the bonding layer was formed between the silicon carbide layers coating the bonding surfaces of the substrates. The specimens of Examples 1 to 3 were good in wettability and workability. It was not observed that the substrates were impregnated with the brazing filler metal. It was found that the silicon carbide layers inhibited the substrates from being impregnated with the melted brazing filler metal. The thickness of the bonding layer was approximately 10 μm in the specimen of Example 1, approximately 25 μm in the specimen of Example 2, and approximately 15 μm in the specimen of Example 3.

Figure 5A:
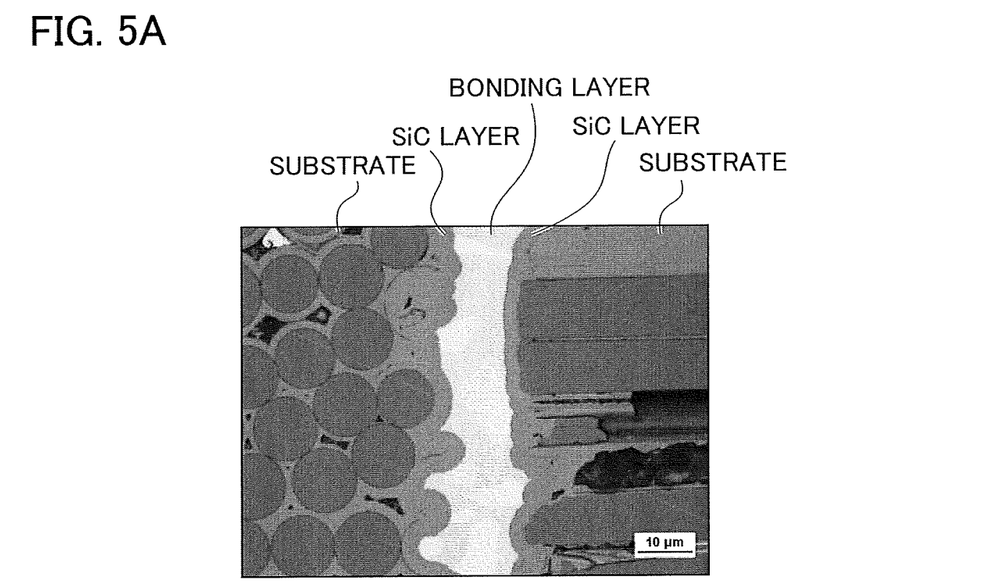
FIG. 5A is a micrograph showing the observed cross-sectional structure of the bonded joint in the specimen of Example 1 in the embodiment of the present disclosure.
Figure 5B:
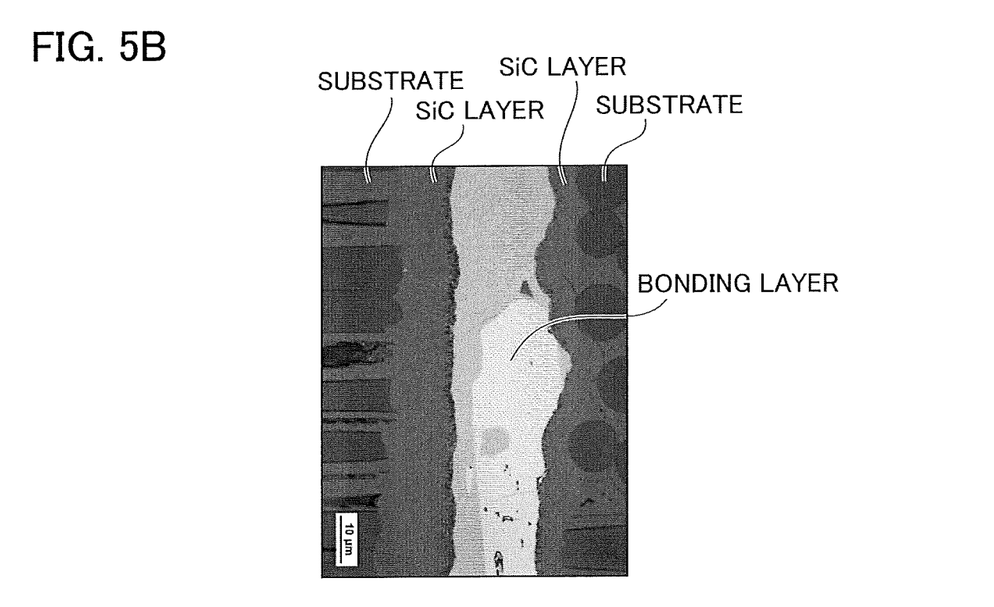
FIG. 5B is a micrograph showing the observed cross-sectional structure of the bonded joint in the specimen of Example 3 in the embodiment of the present disclosure.

Furthermore, the structure size of the bonding layer was smaller in the specimens of Examples 1 and 2 than in the specimen of Example 3. FIG. 5A is a micrograph showing the observed cross-sectional structure of the bonded joint in the specimen of Example 1. FIG. 5B is a micrograph showing the observed cross-sectional structure of the bonded joint in the specimen of Example 3. In the specimens of Examples 1 and 2, the structure size of the bonding layer was less than 100 μm. In contrast, in the specimen of Example 3, the structure size of the bonding layer was equal to or greater than 100 μm.

Next, detailed descriptions will be provided for the structure size of the bonding layer in each specimen. As shown by the micrographs in FIG. 5A and FIG. 5B, the structure sizes of the bonding layers were measured by observing the bonded joints in the corresponding specimens with the microscope. The structure size of each bonding layer was obtained by measuring the length of the metal silicide phase in a direction orthogonal to a thickness direction of the bonding layer (in a direction along the bonding surfaces of the substrates). Since the metal structure of the bonding layer in each specimen was formed of the Si—Ti eutectic structure, the structure size of the bonding layer in each specimen was regarded as the size of the Si—Ti eutectic phase which was the metal silicide phase. In the specimens of Examples 1 and 2, the size of the Si—Ti eutectic phase in the bonding layer was less than 100 μm. In contrast, in the specimen of Example 3, the size of the Si—Ti eutectic phase in the bonding layer was equal to or greater than 100 μm. From these results, it was found that the size of the Si—Ti eutectic phase in the bonding layer was able to be refined by reducing the average particle size of the brazing filler metal to 45 μm or less.

Next, flexural strength properties were evaluated. Flexural test pieces were prepared using the production methods of Examples 1 to 3. The thicknesses of the bonding layers in the flexural test pieces prepared using the production method of Example 1 were in a range of 0.025 mm to 0.5 mm (7 conditions: 0.025 mm, 00.5 mm, 0.1 mm, 0.2 mm, 0.3 mm, 0.4 mm and 0.5 mm). The thicknesses of the bonding layers in the flexural test pieces prepared using the production method of Example 2 were 0.025 mm. The thicknesses of the bonding layers in the flexural test pieces prepared using the production method of Example 3 were 0.015 mm.

Figure 6:
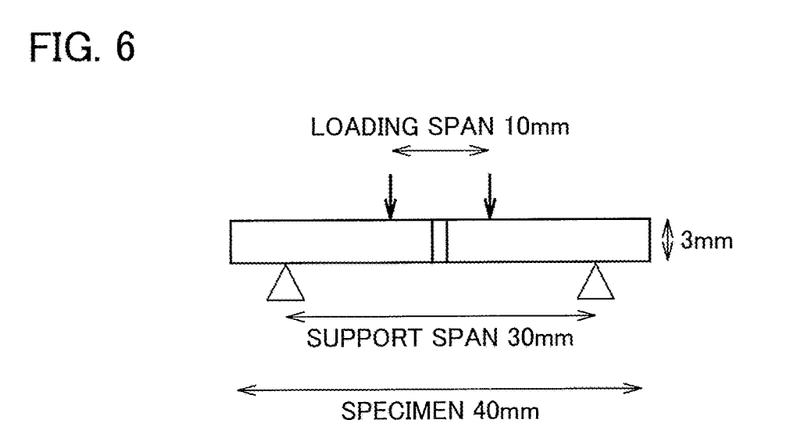
FIG. 6 is a diagram for explaining a flexure test method in the embodiment of the present disclosure.

FIG. 6 is a diagram for explaining a method of the flexure test. The flexure test method was performed in accordance with JIS R 1601. Each flexural test piece was formed in the shape of a rectangle with a width of 4 mm, a length of 40 mm and a thickness of 3 mm', and the bonding layer was arranged in a center portion of the flexural test piece in the longitudinal direction. A four-point flexural test was used in the flexure test. The support span was 30 mm. The loading span was 10 mm. The flexural test temperature was 1100° C. For each condition, two test pieces were tested.

Figure 7:
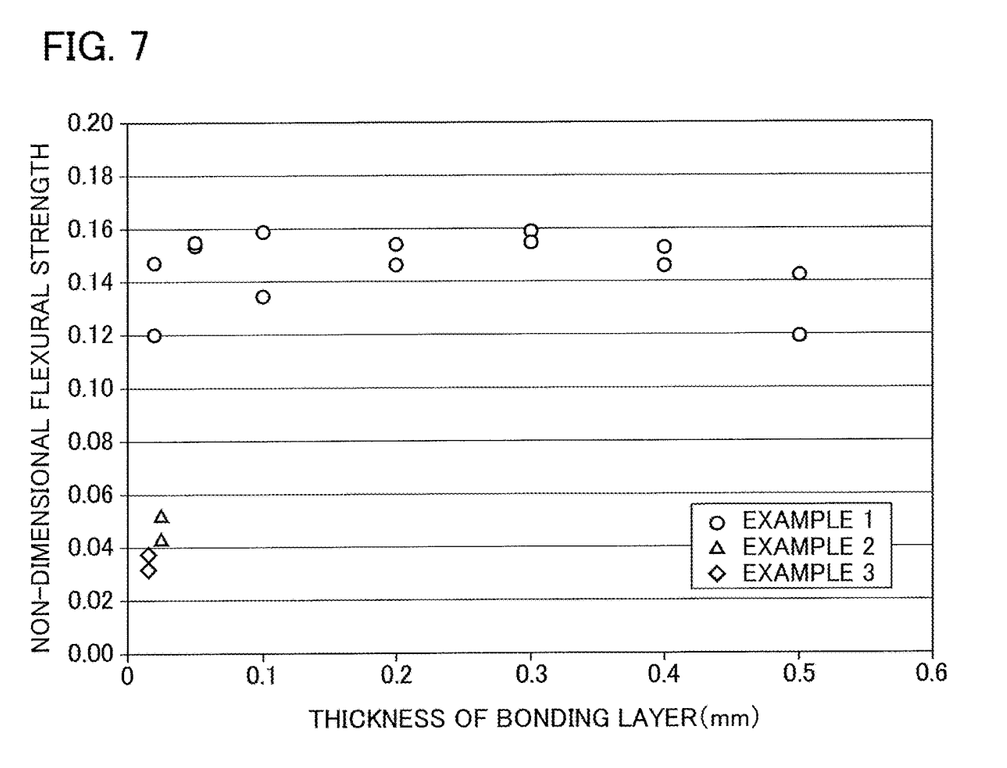
FIG. 7 is a graph showing results of a flexure test in the embodiment of the present disclosure.

FIG. 7 is a graph showing results of the flexure test. In the graph in FIG. 7, the horizontal axis represents the thickness of the bonding layer, and the vertical axis represents the non-dimensional flexural strength (the flexural strength of the brazed joint (MPa)/the flexural strength of the substrate (MPa)). White circles represent the flexural test pieces of Example 1. White triangles represent the flexural test pieces of Example 2. White diamonds represent the flexural test pieces of Example 3. Regarding the flexural test pieces of Example 1, the non-dimensional flexural strength was 0.11 or greater in all the conditions for the thickness of the bonding layer, 0.025 mm to 0.5 mm. The flexural strength was higher in the flexural test pieces of Example 1 than in the flexural test pieces of Examples 2 and 3. Furthermore, the flexural strength was higher in the flexural test pieces of Example 2 than in the flexural test pieces of Examples 3.

For each of the flexural test pieces of Examples 1 to 3, the cross section of the bonded joint was observed after the flexure test. The result was that internal fracture in the substrate and internal fracture in the bonding layer were dominant in bending failure. The internal fracture in the substrate occurred near bonded joints between Y threads, and the internal fracture in the bonding layer occurred near bonded joints between X threads.

The present disclosure is useful for gas turbine components, such as a turbine blade, of a jet engine, as well as a thruster and the like of a rocket engine. Even a component having a complicated shape and the like, such as a gas turbine component, can be easily produced, and the productivity is enhanced, since such a component may be integrated from its divided members by bonding the members together through brazing.

What is claimed is:

1. A method of producing a ceramic matrix composite component, comprising:
    a silicon carbide layer coating step of coating bonding surfaces of a first substrate and a second substrate, each formed of a silicide-containing ceramic matrix composite, with silicon carbide layers; and
    a brazing step of brazing the silicon carbide layer coating the bonding surface of the first substrate and the silicon carbide layer coating the bonding surface of the second substrate by heating and thereby melting a brazing filler metal, in a form of powder, formed of a silicon-containing alloy, wherein
    the silicon carbide layer coating step includes filling and sealing voids in the bonding surface of the first substrate and voids in the bonding surface of the second substrate with silicon carbide powder, before coating the bonding surfaces with the silicon carbide layers, and sealing portions are formed of the silicon carbide,
    the voids in the bonding surface of the first substrate and the voids in the bonding surface of the second substrate are voids in spaces between woven fiber bundles, and in the brazing step, an average particle size of the brazing filler metal is 45 μm or less, and the average particle size is measured by a laser diffraction scattering method.

2. The method of producing a ceramic matrix composite component according to claim 1, wherein the silicon carbide layer coating step includes filling and sealing the voids in the bonding surface of the first substrate and the voids in the bonding surface of the second substrate with silicon carbide powder by immersing the first substrate and the second substrate in slurry containing the silicon carbide powder while applying ultrasonic vibration to the slurry, before coating the bonding surfaces with the silicon carbide layers.

3. The method of producing a ceramic matrix composite component according to claim 1, wherein an average particle size of the silicon carbide powder is 3 μm or greater but 5 μm or less.

4. The method of producing a ceramic matrix composite component according to claim 1, wherein the brazing filler metal is a silicon-containing eutectic alloy.

5. The method of producing a ceramic matrix composite component according to claim 1, wherein in the silicon carbide layer coating step, the silicon carbide layers are formed by chemical vapor infiltration.

6. The method of producing a ceramic matrix composite component according to claim 1, wherein in the brazing step, the brazing filler metal is heated at a temperature equal to or greater than a melting point of the silicon-containing alloy, but less than a crystal grain coarsening temperature of reinforcing fiber in the ceramic matrix composite.

7. The method of producing a ceramic matrix composite component according to claim 1, wherein in the brazing step,
the silicon carbide layer coating the bonding surface of the first substrate and the silicon carbide layer coating the bonding surface of the second substrate are butted up against each other with a gap provided in between, and
the gap is filled with the brazing filler metal by making the brazing filler metal, as melted, flow into the gap from outside of the gap.

8. The method of producing a ceramic matrix composite component according to claim 1, wherein in the brazing step, the brazing is performed by
applying the brazing filler metal to at least one of surfaces of the silicon carbide layers coating the bonding surfaces of the first substrate and the second substrate, and thereafter butting up the surfaces of the silicon carbide layers against each other.

9. The method of producing a ceramic matrix composite component according to claim 1, the ceramic matrix composite includes three-dimensional woven fabric obtained by sewing two-dimensional woven fabric with Z threads, and
the voids in the bonding surface of the first substrate and the voids in the bonding surface of the second substrate include voids in surfaces orthogonal to a surface of the two-dimensional woven fabric.

10. The method of producing a ceramic matrix composite component according to claim 1, wherein an average particle size of the silicon carbide powder is 3 μm or greater and 4 μm or less.

11. The method of producing a ceramic matrix composite component according to claim 1, wherein the silicon carbide layer coating step includes filling and sealing the voids in the bonding surface of the first substrate and the voids in the bonding surface of the second substrate with silicon carbide powder by immersing the first substrate and the second substrate in slurry consisting of the silicon carbide powder and a solvent, before coating the bonding surfaces with the silicon carbide layers.

12. The method of producing a ceramic matrix composite component according to claim 1, wherein in the brazing step, a pasty brazing filler metal obtained by mixing the brazing filler metal and a binder including a solvent is used.

13. The method of producing a ceramic matrix composite component according to claim 12, wherein a ratio of the binder/the brazing filler metal is 1/20 or less.

14. The method of producing a ceramic matrix composite component according to claim 1, wherein the brazing filler metal is a Si-Ti eutectic alloy.

15. The method of producing a ceramic matrix composite component according to claim 1, wherein the brazing filler metal is a Si-Y eutectic alloy.

16. The method of producing a ceramic matrix composite component according to claim 1, wherein the brazing filler metal is a Si-Hf eutectic alloy.

17. The method of producing a ceramic matrix composite component according to claim 1, wherein a gap between the silicon carbide layer coating the bonding surface of the first substrate and the silicon carbide layer coating the bonding surface of the second substrate is 10 μm to 1000 μm.

18. The method of producing a ceramic matrix composite component according to claim 2, wherein the silicon carbide layer coating step includes:
defoaming the slurry, and
applying the ultrasonic vibration to the slurry after immersing and leaving the first substrate and the second substrate stand in the defoamed slurry.

19. The method of producing a ceramic matrix composite component according to claim 2, wherein a frequency of the ultrasonic vibration is 23 kHz or more and 28 kHz or less.

* * * * *